Oct. 6, 1964                    V. E. MONIOT                    3,151,395
                               REFLECTOR DEVICE
                            Filed Nov. 13, 1961
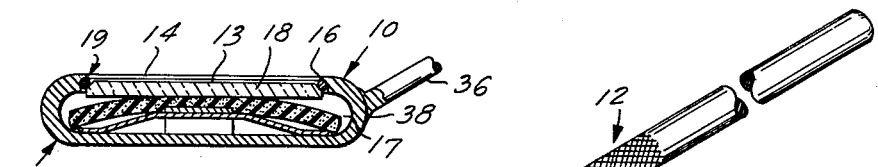
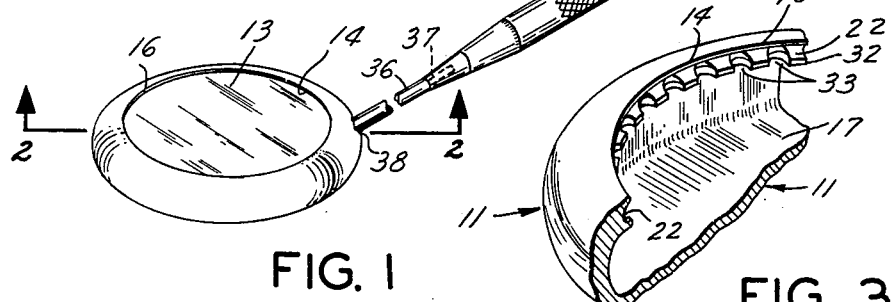
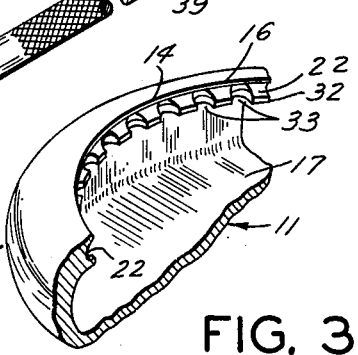
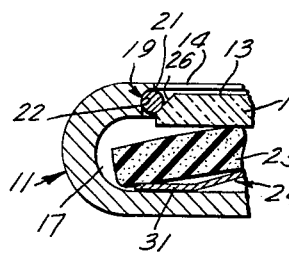 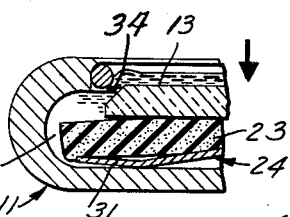 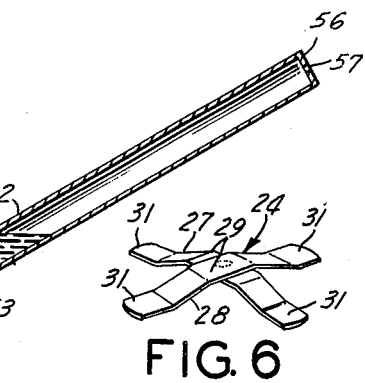
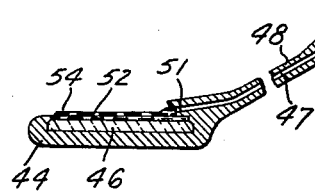 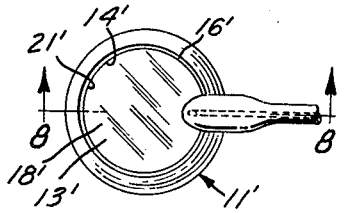
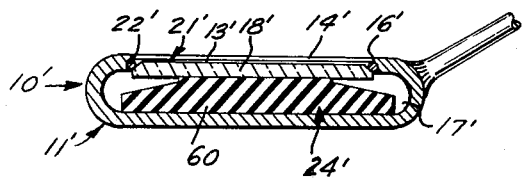
INVENTOR.
VINCENT E. MONIOT
BY
R. E. Geangue
ATTORNEY

United States Patent Office 3,151,395
Patented Oct. 6, 1964

3,151,395
REFLECTOR DEVICE
Vincent E. Moniot, 6301 Aura Ave., Reseda, Calif.
Filed Nov. 13, 1961, Ser. No. 151,739
10 Claims. (Cl. 32—69)

This invention relates to a reflector device and more particularly to an instrument particularly useful as a mirror during dental procedures although it is to be understood that the device may have other applications other than that described herein.

One of the most common instruments used in the dental profession is a small mirror encased in a body having a handle extending angularly therefrom. The mirror is positioned in a patient's mouth so as to reflect surfaces in the mouth which are otherwise difficult to view during dental procedures or operations being performed on the teeth. Equally common in dental techniques is the use of a coolant spray applied by a suitable instrument to the teeth and normally used to continually keep clean an area which is being operated upon while cooling the area so as to prevent excess of pain to be experienced by the patient.

However, such coolant sprays have provided a serious disadvantage during their use. The spray tends to bead and glob to thereby streak the mirror surface during the procedure to the extent that reflected images are indistinguishable.

Therefore, when a coolant spray is used the mirror has to be frequenly cleansed and/or dried so as to provide a clear mirror surface capable of producing a more distinguishable reflected image, causing frequent delays in the procedure and adding considerable discomfort to the patient. Furthermore, the mirror of the reflective instrument tends to constantly collect tooth cuttings and dust including particles of the enamel, dentin, decay, calculus, metal and the like, which further obscures image reflected by the mirror.

Another disadvantage of present devices intended to reflect images prevalent even in the use of dry techniques, is the collection of beads and glob from the normal moisture contained in the air breathed through the mouth of the patient.

It has been found, through experience, that the mirror surface can be kept clear to reflect a sharp image if a solution of wetting agent is applied to the mirror surface. The wetting agent, in the form of a soapy solution or detergent, combined with the coolant spray causes the coolant spray to flow and spread over the mirror surface and thereby to lower the surface tension thereon, forming a relatively thin, even layer of water and wetting agent on the mirror surface without distorting images during the entire dental procedures.

However, inasmuch as pausing to clean the mirror prolongs the time of the procedure and the discomfort of the patient, it has been found more advantageous and practical, and therefore a principal object of this invention to provide a new and improved reflector device which includes a reservoir formed integrally therewith and capable of containing a quantity of a solution of wetting agent instantly available for wetting the mirror surface to reflect a clear image while positioned in its active position relative to the dental procedure.

Another object of this invention is to provide a new and improved reflector device which automatically, or selectively provides a solution of wetting agent to contact the mirror surface for constantly keeping the mirror surface clear of beads and globs of moisture or other foreign particles for reflecting a relatively clear image.

A further object of this invention is to provide a new and improved reflector device in which the solution of wetting agent automatically clears the mirror surface in response to contact of a coolant spray therewith during the use of a coolant spray technique.

Yet another object of this invention is to provide a new and improved reflector device which provides a reservoir of a solution of a wetting agent, such as detergent, or the like, which, in combination with moisture normally associated during a dental technique assists in washing off foreign particles from the mirror surface so as to keep the mirror surface capable of reflecting a clear image.

Another object of this invention is to provide a reflector device of the character described in which the reservoir is easily and readily refillable and in which all components thereof are readily accessible for complete sterilization of the device.

A further object of this invention is to provide a new and improved reflector device of the character described in which the components are compatible with the high temperatures required for sterilization thereof so as to prevent corrosion and deterioration of the device and of components thereof during the process of sterilization and which provides improved means for facilitating flow of fluids around the components thereof during the process of sterilization.

Yet another object of this invention is to provide a new and improved reflector device which maintains a clearer mirror surface even when in close proximity to sources of moisture and which in fact actually combines with the moisture to act on the mirror surface so as to provide a clearer mirror surface capable of reflecting a relatively clear image.

Still another object of this invention is to provide a new and improved reflector device which is economical to manufacture and is capable of mass production.

A general object of this invention is to provide a new and improved reflector device of the character described which overcomes disadvantages of prior means and methods heretofore intended to accomplish generally similar purposes.

These and other objects of this invention will be more apparent from the following detailed description, drawings and appended claims.

In the drawings:

FIGURE 1 is a perspective view, in elevation, of the reflector device of this invention with parts thereof illustrated as being foreshortened for convenience;

FIGURE 2 is a vertical, cross-sectional view as taken substantially along the line 2—2 of FIGURE 1;

FIGURE 3 is an enlarged, fragmentary view, illustrating a portion of the reflector device of this invention in greater detail;

FIGURE 4 is an enlarged, fragmentary, vertical, cross-sectional view showing one end of the configuration of FIGURE 2 in greater detail and in a normal position;

FIGURE 5 is an enlarged, fragmentary, vertical, cross-sectional view, similar to FIGURE 4, showing another operative position of component parts thereof;

FIGURE 6 is a perspective view, illustrating spring means of the embodiment of the figures above in greater detail;

FIGURE 7 is a fragmentary plan view, of a modified embodiment of this invention;

FIGURE 8 is a vertical, cross-sectional view as taken substantially along the line 8—8 of FIGURE 7 and including a disclosure of the handle means thereof; and FIGURE 9 is a vertical, cross-sectional view, similar to FIGURE 2, illustrating a further modified embodiment of this invention.

Referring in detail to the drawings, and more particularly to FIGURES 1-6, inclusive, there is shown by way of illustration, but not of limitation, a first embodiment of a reflector device designed and constructed in accordance with this invention and generally designated by the numeral 10. The reflector device 10 is particularly useful for reflecting images of objects located interiorly of the mouth of a patient for viewing desired surfaces thereof during dental procedures although it will be recognized that the device of this invention may be applied to various other uses.

In general, the device 10 comprises a hollow cup-shaped body 11 having a handle 12 secured to the exterior of the body and extending outwardly and angularly therefrom for facilitating selective positioning of a mirror surface 13 thereof relative to surfaces to be reflected during its use, a reservoir defined within the device and means for selectively effecting a flow of fluid stored within the reservoir over the reflected surface 13 for wetting the surface for the purpose described above.

The cup-shaped body 11 has an opening 14 and a circular, inwardly-facing lip 16 defining an entrance to the interior 17 of the body, the interior 17 of the body constituting, in the instant embodiment, a reservoir capable of storing a liquid wetting agent, in the form of a detergent solution, or the like.

The mirror surface 13 is formed on one side of a circular disc 18 movably mounted within the body 11 and having the reflective surface 13 juxtaposed to the opening 14. The disc 18 is retained from inadvertent removal from the body 11 by retaining means 19 detachably secured in the peripheral lip 16. The retaining means 19 includes a split ring 21 of expandable spring material seated in a groove 22 of the lip 16, the split ring 21 being retained within the groove 22 by the expansion of the ring.

Means are provided for biasing the disc 18 into a position adjacent to the opening 14 so as to be visible therethrough. Such means includes a pad 23 fitting into the interior 17 of the body and a spring member 24 biasing the pad 23 into engagement with the underside of the disc 18 and thereby biasing the disc 18 in a direction towards the opening 14. The disc 18 is preferably beveled at its periphery, as indicated at 26, which engages the annular retaining ring 21 in response to the upward biasing force of the spring 24 and aids in centering the disc 18 relative to the opening 14.

The pad 23 is preferably formed of an absorbent material capable of withstanding high temperatures during sterilization, such as paper fibers, or the like, which, in itself, has the characteristic of being substantially resilient. The resilient means 24 underlies the pad 23, as best seen in FIGURES 2 and 6 and comprises a pair of leaf springs 27 and 28 having elevated central portions 29 secured together and relatively flat depending foot portions 31 spaced downwardly therefrom and formed of a resilient spring material of non-corrosive material, such as stainless steel, or the like.

To facilitate flow of fluid between an area above the reflective surface 13 of the disc 18 and the reservoir 17, an inner annular flange 32, formed by the groove 22 in the lip 16, is provided with a plurality of circumferentially-spaced, radial notches 33. In this manner, the reservoir 17 may be easily and readily filled with a liquid wetting agent by manually, or otherwise, depressing the disc 18 against the spring force of the resilient member 24 into the position illustrated more particularly in FIGURE 5, and pouring the liquid wetting agent on top of the disc 18 to flow readily through the space 34 formed between the flange 32 and the bevel 26 of the disc 18. The flow is facilitated by the notches 33 of the flange 32.

In use, when a dental instrument is used to supply a coolant spray within the patient's mouth, and the spray contacts the surface 13, a supply of detergent may be caused to flow upwardly and over the surface 13 by depressing the disc 18 inwardly of the reservoir 17 and against the spring force of the resilient means 24. Such action causes the absorbent pad 23 to squeeze out an amount of fluid within the pad 23 to flow upwardly over the disc 18. The detergent fluid combines with the moisture collected on the surface of the reflector 13 which normally beads and globs when in contact therewith to streak the mirror surface to the extent that reflected images are indistinguishable. The coolant spray, striking the mirror surface, runs to the edges of the mirror surface 13 or disc 18 or contacts the edge of the mirror directly, thereby picking up a given amount of detergent or wetting agent and, as a result, spreads back over the surface 13 thereby lowering the surface tension and forms a thin, even layer of water and wetting agent to exist on the surface 13 without distorting images during the entire dental procedure and without stopping the procedure to clean the mirror. Each time the mirror surface 13 becomes distorted with moisture and foreign particles, the mirror disc 18 may be depressed to cause a flow of wetting agent upwardly and thereover to combine with such moisture to repeat the clearing procedure.

In this manner, the coolant spray which normally forms only beads and globs is changed into a layer capable of washing the surface 13 of such impurities in addition to providing a relatively sharp and clear reflected image to the user. Also, the mirror surface 13 may be easily and readily continually kept clear without removing the device during the dental procedure and further causing increased discomfort to the patient by prolonging the time of the dental operation.

The disc 18 may be periodically depressed during the operation by engagement of the device with the instrument providing the coolant spray itself or optionally by contact with the reflected surface 13 with the inner surfaces of the teeth, if such procedure does not cause discomfort to the patient.

The device 10 may be easily and readily cleaned by depressing the disc 18 relative to the resilient means 24 as in FIGURE 5 to facilitate flowing of a cleaning agent through the body 17 and around its component parts. For complete sterilization, however, the device is preferably dismantled and the component parts sterilized in a conventional sterilizing device. The materials used are preferably such as to be compatible with sterilizers using high temperatures for the purpose of sterilization, many reaching extremes of 250° F.

To dismantle the device 10, the retaining ring 21 may be easily and readily removed from the groove 22 by annularly compressing the ring, after which the disc 18 may be slipped outwardly of the housing 17 through the opening 14 and, in turn, the pad 23 and the spring member 24 removed from the interior of the housing. After sterilization, the component parts may be returned into the interior of the body 11 and held in place by the retaining ring 21 replaced in the groove 22. The body 11 is preferably formed of a stainless steel material or the like which is non-corrosive and capable of withstanding temperatures for sterilization as is the handle portion 12. The handle portion 12 is preferably secured to a stem 36 by a threaded connection 37, the stem 36 being preferably secured to the exterior of the body 11 as by soldering, welding, or the like, indicated at 38. For convenience in handling, the exterior of the handle is preferably knurled or otherwise roughened, as indicated at 39, to prevent slipping.

It will now be more clearly understood, from the foregoing description, that the body 11 forms a reservoir housing which is relatively sturdy in construction and capable of withstanding biting pressures in all directions during use thereof and is formed relatively deep so as to allow considerable relative movement of the disc 18 against the resilient means 24 positioned therebetween to prevent the teeth or other foreign objects from crushing the mirror against the back of the reservoir. During use, the mirrored disc 18 may be easily and readily depressed relative to the reservoir for supplying a desired amount of wetting agent without removal thereof from the mouth of the patient or removal of the spray instrument during the operation thereby avoiding delays during the dental procedure.

Referring more particularly to FIGURES 7 and 8, a second embodiment of this invention is illustrated in which the reservoir is formed integrally with the handle 12. In the instant embodiment, the handle 42 is substantially hollow in construction, having a reservoir 43 comprising the interior of the handle. Otherwise, the handle 42 is substantially identical, in appearance and function, to the handle 12 of the first embodiment. A mirror supporting body 44 may be formed identically to that of the first embodiment, or optionally formed as illustrated in FIGURE 3 and having a disc 46 mounted rigidly within the body 44 as illustrated.

A passageway 47 is formed in the stem portion 48 of the handle 42, the passageway having one end 49 communicating with the interior of the reservoir 43 and its outer end 51 extended adjacent to the mirror surface 52 of the disc 46 so as to communicate a fluid wetting agent 53 contained within the reservoir to the surface 52 as indicated at 54. The handle 42 is preferably formed with a closed end 56 having an aperture 57 extending therethrough for selectively admitting air into the interior thereof. It is to be understood, however, that the aperture 57 may be provided in any convenient wall portion of the handle portion 42 to admit air within the reservoir 43 and thereby permit flow of the fluid 53 when needed. In use, a valve means may be provided to normally close the aperture 57 and opened to close the aperture to stop flow of fluid from the reservoir to passageway 47 and thereby to the surface 52 for wetting the surface for the purpose described above. When closed, the aperture 57 prevents fluid from flowing outwardly and, when opened, the fluid 53 may readily flow through the passageway 47. Preferably, the aperture 57 may be conveniently opened and closed, by respectively covering and uncovering the opening 57 by a finger of the user while supporting the handle 42 by the remainder portion of the user's hand. Optionally, a suitable valve may be employed for adjusting the area of the opening 57 in any convenient manner, such as a plug valve, or the like.

Referring more particular to FIGURE 9, a third embodiment of this invention is disclosed, substantially similar to the first embodiment; like parts are referred to by like numbers which are primed. In the instant embodiment, referred to by the numeral 10′, a body 11′ forms a reservoir 17′ interiorly thereof, similar to the first embodiment, and communicating with an opening 14′ having a peripheral lip 16′ in which an annular groove 22′ is formed to seat a retaining ring 21′ for retaining a disc 18′ having a reflective surface 13′ facing the opening 14′. In the instant embodiment, the resilient means 24′ comprises a resilient, absorbent member 60 in the form of an absorbent pad having resilience sufficient to bias the disc 18′ into a position adjacent to the opening 14′. The pad 60 of the resilient means 24′ also serves to retain a liquid wetting agent within the reservoir 17′ which is squeezable therefrom in response to inward movement of the disc 18′ relative to the interior 17′ in the manner previously described in connection with the first embodiment. The pad 60 preferably comprises a material which is not only resilient and absorbent but is capable of withstanding temperatures sufficient for sterilization thereof during a procedure to sterilize the component parts and the interior of the reservoir 17′.

While there is herein shown and described what is conceived to be the most practical and preferred embodiments of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. A reflector device comprising: a hollow, cup-shaped body having an opening and a circular, inwardly-facing lip around said opening and defining an entrance to the interior of said body; the interior of said body defining a fluid reservoir capable of storing a fluid wetting agent; handle means secured to the exterior of said body and in an upwardly and outwardly extending angular relationship to said body; a circular reflector member in said body and extensible through said opening and having a relatively flat mirror surface facing said opening; retaining means removably secured on said lip of said body adjacent to said opening for retaining said reflector member in said body so as to prevent inadvertent removal of said reflector member, said reflector member being movable in said body; means for biasing said reflector member adjacent to said opening and for selectively effecting a flow of fluid contained in said reservoir to flow over said mirror surface of said reflector member for wetting said mirror surface and for preventing condensation of extraneous moisture thereon in response to inward movement of said reflector means into said interior of said body.

2. A reflector device as defined in claim 1, wherein said last mentioned means includes a pad of compressible, resilient, absorbent material interposed between said reflector member and the wall of said body, said pad being capable of absorbing fluid stored in said reservoir, said pad being compressible in response to inward movement of said reflector member inwardly of said body for emitting said fluid to flow over said mirror surface of said reflector member and resiliently biasing said reflector member adjacent to said retaining means in response to release thereof.

3. A reflector device as defined in claim 2, including spring means interposed between said pad and the wall of said body biasing said pad and said reflector means adjacent to said opening.

4. A reflector device as defined in claim 1, wherein said retaining means includes an annular compressible member and said lip includes an annular groove, said annular member residing in said groove and having an inner diameter substantially smaller than the outer diameter of said reflector member.

5. A reflector device as defined in claim 4, including means defining radial notches in said groove and communicating between the interior of said body reservoir and said groove so as to permit flow of said fluid from said mirror surface of said reflector surface to return to said reservoir while said reflector member is biased into a position adjacent to said retaining means.

6. A reflector device comprising:
a hollow body having an opening and a peripheral lip integrally formed with said body and surrounding said opening,
handle means secured to the exterior of said body,
a disc in the hollow interior of said body having a reflective mirror surface facing said opening,
retaining means for retaining said disc in said body adjacent to said opening,
means defining a fluid reservoir communicating with said opening and adapted to contain a fluid wetting agent, and
means for selectively effecting a flow of the fluid stored in said reservoir over said reflector surface of said disc for wetting said surface,
said effecting means comprising a resilient pad of absorbent material in said reservoir capable of absorbing a quantity of said fluid wetting agent, said pad being responsive to inward movement of said disc relative to the interior of said body for squeezing out fluid to flow over said mirror surface of said disc.

7. A reflector device comprising:
a hollow body having an inwardly-facing lip defining an opening leading to the interior of the body;
handle means secured to the exterior of said body;
reflector means in said body and extending into said opening;
means for holding said reflector means in position adjacent said lip;
a mirror surface on the surface of said reflector means opposite the interior of said body;
the interior of said body defining a fluid reservoir for containing a fluid wetting agent; and
means in said reservoir for distributing the fluid within said reservoir and around the edges of said reflector means for application to said mirror surface;
said distributing means comprising a pad of absorbent material occupying a substantially portion of said reservoir and capable of absorbing a quantity of said fluid wetting agent.

8. A reflector means as defined in claim 7 comprising:
spring means located between said pad and said body for biasing said reflector means towards said opening.

9. A reflector device comprising:
a hollow body having an inwardly-facing lip defining an opening leading to the interior of the body;
handle means secured to the exterior of said body;
reflector means in said body and extending into said opening;
means for holding said reflector means in position adjacent said lip;
a mirror surface on the surface of said reflector means opposite the interior of said body;
the interior of said body defining a fluid reservoir for containing a fluid wetting agent; and
means in said reservoir for distributing the fluid within said reservoir and around the edges of said reflector means for application to said mirror surface;
said holding means permitting movement of said reflector means into the interior of said hollow body for forcing fluid from said reservoir around the edges of said reflector means and onto said mirror surface.

10. A reflector device comprising:
a hollow body having an inwardly-facing lip defining an opening leading to the interior of the body;
handle means secured to the exterior of said body;
reflector means in said body and extending into said opening;
means for holding said reflector means in position adjacent said lip;
a mirror surface on the surface of said reflector means opposite the interior of said body;
the interior of said body defining a fluid reservoir for containing a fluid wetting agent; and
means in said reservoir for distributing the fluid within said reservoir and around the edges of said reflector means for application to said mirror surface;
said distribution means comprising a pad of absorbent material capable of absorbing a quantity of said fluid wetting agent;
said holding means permitting movement of said reflector means into the interior of said hollow body for forcing fluid from said reservoir around the edges of said reflector means and onto said mirror surface.

References Cited in the file of this patent

UNITED STATES PATENTS

| 863,364 | Dercherd | Aug. 13, 1907 |
| 1,925,981 | Hopkins | Sept. 5, 1933 |
| 3,014,279 | Fosdal | Dec. 26, 1961 |
| 3,052,031 | Piscitelli | Sept. 4, 1962 |

FOREIGN PATENTS

| 992,475 | France | Oct. 18, 1951 |